United States Patent [19]

Jones et al.

[11] Patent Number: 5,216,053

[45] Date of Patent: Jun. 1, 1993

[54] CHLORINATED POLYETHLENE MASTIC ADHESIVE COMPOSITIONS, AND PROCESS FOR THE PRODUCTION OF THESE COMPOSITIONS

[75] Inventors: Edward Jones; Norman E. Warren, both of Baton Rouge, La.

[73] Assignee: The Dow Chemical Company, Midland, Mich.

[21] Appl. No.: 619,283

[22] Filed: Nov. 27, 1990

Related U.S. Application Data

[63] Continuation-in-part of Ser. No. 429,875, Oct. 30, 1989, abandoned.

[51] Int. Cl.⁵ .............................................. C08K 5/15
[52] U.S. Cl. .................................... 524/114; 524/273; 524/295; 524/297; 524/314; 524/464; 524/569; 525/349
[58] Field of Search ............... 524/569, 273, 295, 297, 524/314, 464, 114

[56] References Cited

U.S. PATENT DOCUMENTS 4,910,245  3/1990  Flynn et al. ..................... 524/528

*Primary Examiner*—John C. Bleutge
*Assistant Examiner*—Mark Sweet

[57] ABSTRACT

Chlorinated polyethylene mastic adhesive compositions, and process for the production of such compositions, formed from chlorinated polyethylene and a compatible plasticizer. These mastic compositions are useful for bonding and sealing together membranes, particularly chlorinated polyethylene membranes, at ambient conditions without application of heat. The ability to form seals of high peel strength in roofing applications without the use of heat is of particular importance. In another embodiment however, cross linking agents can be incorporated within the recipe, and seals of even greater peel strength obtained. Heat is required in the sealing operation in this instance to produce cross linking of the polymer. One thus has the choice of forming adhesives of high peel strength for roofing applications without any necessity of using heat; or, alternatively, to form adhesives of even greater peel strength with the use of heat.

11 Claims, No Drawings

CHLORINATED POLYETHLENE MASTIC ADHESIVE COMPOSITIONS, AND PROCESS FOR THE PRODUCTION OF THESE COMPOSITIONS

RELATED APPLICATIONS, OR PATENTS

This is a continuation-in-part of application Ser. No. 429,875, filed Oct. 30, 1989, now abandoned. The parent application, like the present application, is in the names of Edward Jones and Norman E. Warren.

FIELD OF THE INVENTION

This invention relates to chlorinated polyethylene mastic adhesive compositions, and process for the production of such compositions. In particular, it relates to chlorinated polyethylene mastic adhesive compositions useful for bonding together membranes, especially chlorinated polyethylene membranes, without the application of heat, and process for the production of such compositions.

BACKGROUND AND PROBLEMS

In roofing procedures it is well known to cover the roofs of large buildings with moisture impervious single ply sheets, or membranes. Typical industrially used single ply roofing membranes are, e.g., EPDM, an ethylene propylene dimer, TYRIN*, a chlorinated polyethylene, HYPALON, a chlorosulfonated polyethylene, and PVC. In the roofing procedure, large sheets of the material are laid one adjacent another to cover the entire roof, the upper sheets overlapping the lower sheets at their marginal edges. Conventionally, the lapped edges of the roofing membranes are sealed, or bonded together to form a water proof seal. These seals are effected by a) heat seaming for thermoplastics, b) solution adhesives, and c) solid adhesives. Solution adhesives are generally used to seal the roofing membranes in more inaccessible or restricted areas, e.g., around chimneys, vents, or the like. The solution adhesives do not form bonds of strength as great as is characteristic of the heat set seaming process. The necessity of heating the lapped edges can be burdensome, and yet this type of bonding has proven most effective as contrasted with other types of bonds. Consequently, there exists a clear present need for high quality mastic adhesive compositions which do not require the application of heat to bond together the lapped edges of the roofing membranes as in roofing constructions.

*TYRIN is a registered trademark of The Dow Chemical Company.

OBJECTS

It is, accordingly, a basic objective of this invention to satisfy this need, and others.

In particular, it is an object of this invention to provide mastic adhesive compositions for bonding together roofing membranes, especially the lapped edges of single ply roofing membranes as used in roofing procedures.

A specific object is to provide solid mastic adhesive compositions which can be used to bond together and seal single ply roofing membranes, especially chlorinated polyethylene roofing membranes, at ambient conditions without any requirement of applying heat.

It is a further object of this invention to provide mastic adhesive compositions which, if desired, can be heated, or otherwise treated, to crosslink the polymer of the adhesive, to form a mastic adhesive composition of high cohesiveness, and greater peel strength than conventionally used mastic adhesive compositions.

THE INVENTION

These and other objects are achieved in accordance with this invention which embodies solid mastic adhesives formed from a chlorinated polyethylene polymer of low crystallinity, preferably an amorphous chlorinated polyethylene polymer, and a plasticizer. The chlorinated polyethylene polymer is one which contains from about 28 percent to about 42 percent, preferably from about 30 percent to about 40 percent, chlorine, based on the weight of the polymer. The weight average molecular weight of the chlorinated polyethylene polymer ranges from about 80,000 to about 300,000, preferably from about 120,000 to about 200,000. An amorphous chlorinated polyethylene polymer of weight average molecular weight and chlorine content within these ranges, which is compatible with the plasticizer, can be readily masticated therewith to form a cohesive solid, sticky mastic adhesive. These adhesives, in a principal application, can be placed between single ply roofing membranes and simply pressed at ambient conditions to form adhesive bonds without application of heat. A chlorinated polyethylene polymer of low crystallinity can be similarly masticated with a compatible plasticizer to form an acceptable cohesive solid, sticky, mastic adhesive. For purposes of this invention, a chlorinated polyethylene polymer which measures less than 0.5 calories/gram (cal/gm), as measured by Differential Scanning Calorimetry (DSC), is amorphous. A chlorinated polyethylene polymer is of low crystallinity when the DSC measurement ranges from 0.5 cal/gm to about 4.5 cal/gm. The chlorinated polyethylene polymer of this invention measures less than about 4.5 cal/gm by DSC, preferably below about 3 cal/gm by DSC, and more preferably below 0.5 cal/gm by DSC.

Essentially any plasticizer having good compatibility on being masticated, or dissolved with the chlorinated polyethylene polymer can be used to form acceptable solid mastic adhesives. Suitably, the plasticizer is used in concentrations of plasticizer: polymer in a range of from about 1:1 to about 3:1, based on weight, to dissolve the polymer to form a homogenous mixture of the two components. This mixture of the two components, with or without addition of other components can be processed on a cold two roll mill to form a cohesive solid sticky sheet of the mastic adhesive. The sheet of mastic adhesive can then be stored, and subsequently used at a distant roofing site. The sheet of mastic adhesive, or sections thereof, can be transported to the job site, placed between membranes which are to be joined, and the sheets pressed together at ambient conditions to effectively form a leak proof seal between the adjoined sheets. The mastic adhesive, on the other hand, can be made at the site where the roofing is to be done, the mastic adhesive placed between pairs of overlapped roofing membranes, and then pressed at ambient conditions to join the membranes together to form a water proof seal. Preferred plasticizers for the practice of this invention include the ester plasticizers, particularly aromatic ester plasticicizers, chlorinated paraffin plasticizers, and epoxidized vegetable oil plasticizers. Exemplary ester plasticizers are, e.g., those based on adipic, phthalic and mellitic acids, and include for example, trioctyltrimellitate, dioctyl adipate, neopentyl glycol adipate, dibutyl phthalate, dinonyl phthalate, diisobutyl phthalate, tetra-n-butyl pyromellitate, tetra-2-ethylhexyl pyromellitate, and the like; and including such aromatic ester plasticizers, e.g., as benzyl octyl adipate and the like. Exemplary chlorinated hydrocarbon plasticizers include chlorinated paraffins, chlorinated biphenyls, chlorinated terphenyls, chlorinated naphthalenes, polyalkyl naphthalenes, and the like. Exemplary epoxidized vegetable oil include epoxidized soybean oil, epoxidized linseed oil, tall oil, cottonseed oil and the like. Fillers, pigments and other materials can be added to the polymer-plasticizer mixture as may be desired.

The ability to form a seal with the solid mastic adhesive of this invention without any necessity of applying heat offers a profound advantage in roofing constructions. On the other hand however, heat can be used to advantage in some applications to form seals of somewhat greater cohesiveness, and in particular greater peel strength as contrasted with conventional mastic adhesives. This is done by adding a cross-linking agent to the chlorinated polyethylene polymer-plasticizer recipe, and then applying heat at the time of forming the seal to produce cross-linking throughout the solid mastic adhesive composition. In another embodiment therefore, a chlorinated polyethylene, plasticizer, and cross-linking agent are admixed together and masticated to form a homogenous mixture of these components. For example, the polyethylene polymer and plasticizer are admixed in weight ratio of plasticizer:polymer of from about 1:1 to about 3:1, along with the cross-linking agent, and generally with a filler and pigment. The mixture is then allowed to stand, generally for a period ranging from about 0.5 hour to about 5 hours, preferably from about 1 hour to about 2 hours. The admixture is then processed on a cold two roll mill for time sufficient to form a sticky sheet, or slabstock, this generally requiring from about 0.1 hour to about 1 hour, most often from about 0.2 hour to about 0.5 hour. The sheet of the cohesive solid, sticky mastic adhesive produced in this manner can then be placed between a pair of membranes, e.g., single ply roofing membranes such as EPDM, TYRIN or HYPALON, and the sheets then sealed one to the other by heating to temperatures ranging from about 100° C. to about 400° C., preferably from about 200° C. to about 375° C., dependent on heating time, to produce cross-linkage of the polymeric material. This embodiment, albeit it may employ heating and pressing the sealed surfaces to form the bond at the site of use, compensates for the added burden in that it provides a bond of superior peel strength, especially as contrasted with conventional mastic adhesive compositions, similarly applied and similarly heated. One thus has the option of merely pressing the mastic adhesive between a pair of sheets, or membranes, without application of heat to seal them in place, or heating and pressing the mastic adhesive between a pair of sheets, or membranes, to form a seal of yet greater peel strength.

A suitable cross-linking agent for the practice of this invention is dimercaptothiadiazole. The cross-linking agent is generally used in the chlorinated polyethylene polymer-plasticizer composition in concentration ranging from about 5 parts per 100 parts of resin (phr) to about 20 phr, preferably from about 10 phr to about 15 phr, based on the weight of the chlorinated polyethylene.

The following examples are further exemplary of the types of plasticizer, and chlorinated polyethylene polymer (CPE; or TYRIN), useful in the practice of this invention. In the examples which follow all parts are in terms of weight units except as otherwise specified. Pressures are in terms of pounds per square inch absolute, and temperatures are given in terms of degrees Fahrenheit.

EXAMPLES 1-8

In a first series of runs 100 part by weight portions of chlorinated polyethylene polymer (TYRIN) of differing composition, crystallinity, and molecular weight were combined with 150 part by weight portions of a plasticizer, trioctyltrimellitate, allowed to stand overnight, and the compatibility of each of the mixtures was observed; with the following results:

| CPE Polymer Designation | Polymer Properties Wt. % Chlorine Content | Crystallinity, DSC | Molecular Weight | Observations |
| --- | --- | --- | --- | --- |
| TYRIN CM 0136 | 36 | <0.5 cal/gm | 150,000 | OK. Formed solid mass. |
| TYRIN CM 0836 | 36 | <0.5 cal/gm | 300,000 | OK. Formed solid mass. |
| TYRIN CM 0636 | 36 | <0.5 cal/gm | 80,000 | OK. Mixture drier, but tackier than CM 0136 or CM 0836. |
| TYRIN CM 0342 | 42 | <0.5 cal/gm | 120,000 | Borderline. Excess liquid. Compatibility exceeded. |
| TYRIN CM 0730 | 30 | <0.5 cal/gm | 150,000 | OK. Tacky, but dry. |
| TYRIN CM 3623A | 36 | 3 cal/gm | 120,000 | OK. Similar to results with CM 0636. |
| TYRIN 631 | 42 | 3 cal/gm | 120,000 | OK. Good tack. |
| TYRIN 2552 | 25 | 11 cal/gm | 120,000 | Limited compatibility. Did not fuse, no integrity. |

EXAMPLES 9-19

In a second series of runs 100 part by weight portions of TYRIN CM 0836, as identified in the preceding examples, were admixed with 150 part by weight portions of a number of different plasticizers. These mixtures were allowed to stand overnight and thereafter the compatibility of the mixtures was observed.

| Plasticizer | Observations |
| --- | --- |
| PARAPLEX G60 (Epoxidized soybean oil) | Compatible |
| DINP (Diisononylphthalate) | Compatible |
| DRAPEX 4.4 | Compatible |

| Plasticizer | Observations |
| --- | --- |
| (Epoxidized soybean oil) | |
| DOS | Compatible |
| (Dioctylsebacate) | |
| CHLOROWAX LV | Compatible |
| (Chlorinated paraffin) | |
| DOP | Compatible |
| (Dioctylphthalate) | |
| DRAPEX 6.8 | Compatible |
| (Epoxidized soybean oil) | |
| SANTICIZER 711 | Compatible |
| (Dialkylphthalate) | |
| TOTM | Compatible |
| (Trioctyltrimellitate) | |
| DOA | Compatible; |
| (Dioctyladipate). | More creamy texture |

In contrast, 100 part by weight specimens of the TYRIN CM 0836 when added to 150 part by weight specimens of other plasticizers were not satisfactory. SUNDEX 790, a petroleum based aromatic plasticizer, SUNPAR 2280, a petroleum based paraffin plasticizer, and CIRCOLITE RPO, a petroleum based naphthenic plasticizer did not provide acceptable results. The SUNPAR 2280 was only slowly absorbed by the TYRIN CM 0836, and there was no integrity. The SUNPAR 2280 was not absorbed at all by the TYRIN CM 0836 or the CIRCOLITE RPO, and the materials separated. DAP, a diallylphthalate, gave only limited compatibility in this test, an unacceptable result.

The following example illustrates a preferred method of forming the solid mastic adhesive of this invention, and demonstrates its effectiveness as a sealant for single ply CPE roofing membranes.

EXAMPLE 20

(a) One hundred fifty grams, g, of plasticizer, trioctyltrimellitate, were mixed with 100 g of TYRIN CM 0836, a CPE polymer having a molecular weight of about 300,000, a crystallinity of <0.5 cal/gm DSC, and containing 36 wt. % chlorine. The mixture was allowed to stand for 1-2 hours. The mixture was then transferred to a water cooled two roll mill, as commonly used in the rubber industry, where 40 g of Silene D filler and 5 g TiO$_2$ pigment was added. The mixture was changed into a white, sticky sheet on processing on the two roll mill at ambient temperature. The gap between the rolls was controlled to obtain good shearing action as evidenced by a smooth rolling bank. After a period of between 5 and 30 minutes, the roll was stopped and the sheet was cut across. The roll mill was then restarted and the sheet material was peeled off in a slabstock form. The slabstock was then placed between slip sheets, e.g., polyethylene film; silicone treated paper. This material was pressed between two sheets of single ply CPE thermoplastic roofing sheeting using ½ ton pressure on a 5" diameter ram, for 2 minutes. The sandwiched system was then cut into 6"×1" test strips. These strips were then placed between the jaws of an Instron tensile tester and the jaws were separated at a rate of 2 inches per minute. The force required to peel the sheets apart, or as the mastic itself tore before it separated from the sheet, is a measure of the cohesive force of the adhesive. The value of the thermoplastic material was found to be 7.5 to 8 lbs./inch at room temperature, and 1.5 to 2 lbs./inch at 250° F.

The following example describes the production of a solid mastic adhesive that can cross link on exposure to heat or U.V. light.

EXAMPLE 21

A plasticized CPE was formed as described by reference to Example 20. Ten g of ECHO S, a thiadiazole cure system produced by Hercules, and 10 g of VANOX 808, an accelerator, was admixed together and then added to the plasticized CPE composition. The admixture was then processed on a cold two roll mill and formed into a sheet, or slabstock, and then placed between slip sheets as previously described.

This material was then pressed between two sheets of a single ply CPE thermoplastic roofing sheeting as described by reference to Example 20, except that in this instance the material was heat cured at 320° F. for 10 minutes. In this instance, a force of 14 lbs./inch was required to pull the sheets apart.

This value, as well as the value given in Example 20, is considerably higher than is possible by present industrially used solvent based adhesives, or cements. Solvent based cements such as are used for EPDM roofing systems were found to have low peel strength values in the same T peel test. Here the solvent/neoprene system was applied by brush to two pieces of CPE sheeting and to two pieces of electron beam cured CPE sheeting. The surfaces were contacted within 20 minutes and the bond allowed to set overnight. After 24 hours, it was found that the peel strength of the thermoplastic sheeting bond was less than ½ lb./inch, and there was no measurable bond strength in the EB cured CPE system.

The solid mastic adhesive of this invention has been found especially useful in bonding CPE sheets, these sheets not being bondable by all industrially used adhesives. For example, conventional neoprene-based solvent cements do not bond to the cured CPE sheets. T-peel strength values up to 14 pounds per inch have thus been realized with the cross linked, or cured mixture and approximately 8 pounds per inch with the non-cross linked system. Industry requirements call for a minimum of 3 pounds per inch.

The solid mastic adhesives of this invention are soluble in aromatic solvents, e.g., toluene, xylene, and the like, and can be used to make solvent based cements. Solutions of these adhesives in weight concentrations of solid mastic adhesive: solvent ranging from about 2:1 to about 0.1:1, preferably from about 0.2:1 to about 0.5:1, can thus be used to form solvent based cements of industrially acceptable quality.

The solid mastic adhesives of this invention are admirably suitable for sealing CPE to CPE, and hence are of particular value for sealing together CPE roofing membranes. Additionally, the solid mastic adhesives of this invention are useful for sealing together PVC pipes, and pond linings.

It is apparent that various modifications and changes can be made without departing the spirit and scope of the invention.

Having described the invention, what is claimed is:

1. A mastic adhesive composition useful for bonding and sealing together roofing membranes which consists essentially of an admixture of a chlorinated polyethylene polymer having a crystallinity of less than about 4.5 cal/gm as measured by Differential Scanning Calorimetry, a chlorine content ranging from about 28 percent to about 42 percent, based on the weight of the chlorinated polyethylene polymer, and a weight average molecular weight ranging from about 80,000 to about 300,000 and a compatible plasticizer in weight concentration of plasticizer:polymer ranging from about 1:1 to about 3:1 sufficient to dissolve said chlorinated polyethylene polymer and form a cohesive solid, mastic adhesive from these components which can be pressed between said membranes to bond and seal these members together at ambient temperature.

2. The composition of claim 1 wherein the chlorinated polyethylene polymer has a crystallinity of less than about 3 cal/gm.

3. The composition of claim 2 wherein the crystallinity of the polymer is less than about 0.5 cal/gm.

4. The composition of claim 1 wherein the chlorine content of the polymer ranges from about 30 percent to about 40 percent.

5. The composition of claim 1 wherein the molecular weight of the polymer ranges from about 120,000 to about 200,000.

6. The composition of claim 1 wherein the polymer has a crystallinity of less than about 3 cal/gm, the chlorine content of the polymer ranges from about 30 percent to about 40 percent, and the molecular weight of the polymer ranges from about 120,000 to about 200,000.

7. The composition of claim 1 wherein the polymer is amorphous, contains from about 30 percent to about 40 percent chlorine, and is of molecular weight ranging from about 120,000 to about 200,000.

8. The composition of claim 1 wherein the plasticizer is an ester plasticizer, chlorinated paraffin plasticizer, or an epoxidized vegetable oil plasticizer.

9. The composition of claim 1 wherein the admixture of polymer and plasticizer additionally contains a cross linking agent, which composition can be pressed between said membranes, and heated, to bond and seal these members together to provide peel strength superior to that possessed by pressing the composition between said membranes without application of heat.

10. The composition of claim 9 wherein the cross linking agent is present in the admixture of polymer and plasticizer in concentration ranging from about 5 phr to about 30 phr, based on the weight of the chlorinated polyethylene.

11. The composition of claim 9 wherein the cross linking agent is a dimercaptothiadiazole.

* * * * *